(12) United States Patent
De Jong

(10) Patent No.: US 11,746,690 B2
(45) Date of Patent: Sep. 5, 2023

(54) COMBUSTION ENGINE

(71) Applicant: AIRDAPTIVE LLC, Lewes, DE (US)

(72) Inventor: Arjen Teake De Jong, New York, NY (US)

(73) Assignee: AIRDAPTIVE LLC, Lewes, DE (US)

( * ) Notice: Subject to any disclaimer, the term of this patent is extended or adjusted under 35 U.S.C. 154(b) by 0 days.

(21) Appl. No.: 17/724,633

(22) Filed: Apr. 20, 2022

(65) Prior Publication Data

US 2022/0243647 A1 Aug. 4, 2022

Related U.S. Application Data

(63) Continuation of application No. PCT/IB2020/059835, filed on Oct. 20, 2020.

(30) Foreign Application Priority Data

Oct. 21, 2019 (NL) ...................................... 2024073

(51) Int. Cl.
*F02B 41/08* (2006.01)
*F01L 1/047* (2006.01)
(Continued)

(52) U.S. Cl.
CPC ............. *F02B 41/08* (2013.01); *F01L 1/047* (2013.01); *F01L 1/40* (2013.01); *F02B 69/06* (2013.01)

(58) Field of Classification Search
CPC .......... F02B 41/08; F02B 41/02; F02B 69/06; F02B 25/145; F01L 1/047; F01L 1/40;
(Continued)

(56) References Cited

U.S. PATENT DOCUMENTS 5,699,758 A * 12/1997 Clarke .................. F02B 75/021
123/21
6,340,004 B1 * 1/2002 Patton ....................... F02G 1/02
123/70 R
(Continued)

FOREIGN PATENT DOCUMENTS

DE 102013006703 A1 10/2014
DE 10 2013 009 291 A1 12/2014
(Continued)

OTHER PUBLICATIONS

International Search Report and written opinion issued by the European Patent Office for International Patent Application No. PCT/IB2020/059835, dated Dec. 22, 2020.

*Primary Examiner* — George C Jin
(74) *Attorney, Agent, or Firm* — MYERS WOLIN, LLC

(57) ABSTRACT

A combustion engine is provided having combustion chambers with reciprocating pistons, intake ports and exhaust ports. Transfer ports may be provided between adjacent combustion chambers to provide a transfer channel that closes during a high load mode of operation of the engine and opens during a partial load mode of operation. Also provided are embodiments in which exhaust ports of adjacent combustion chambers are joined into a common exhaust channel that communicates with an exhaust header of the engine through valve means that open during the high load mode of operation of said engine and close during a partial load mode of operation.

9 Claims, 4 Drawing Sheets

(51) Int. Cl.
*F01L 1/40* (2006.01)
*F02B 69/06* (2006.01)

(58) Field of Classification Search
CPC ....... F01L 1/08; F01L 1/38; F01L 1/46; F02D 41/0087; F02D 41/06; F02D 13/0242; F02D 13/0257; F02D 13/06
See application file for complete search history.

(56) References Cited

U.S. PATENT DOCUMENTS

2011/0308505 A1\* 12/2011 Meldolesi ............... F02B 33/22
123/70 R
2015/0090224 A1\* 4/2015 Clarke .................... F02B 33/30
123/445

FOREIGN PATENT DOCUMENTS

| DE | 10 2013 009 292 A1 | 12/2014 | |
|----|---|---|---|
| DE | 102013009291 A1 \* | 12/2014 | ............. F02B 41/08 |
| GB | 2039611 A | 8/1980 | |
| WO | 2017007357 A1 | 1/2017 | |

\* cited by examiner

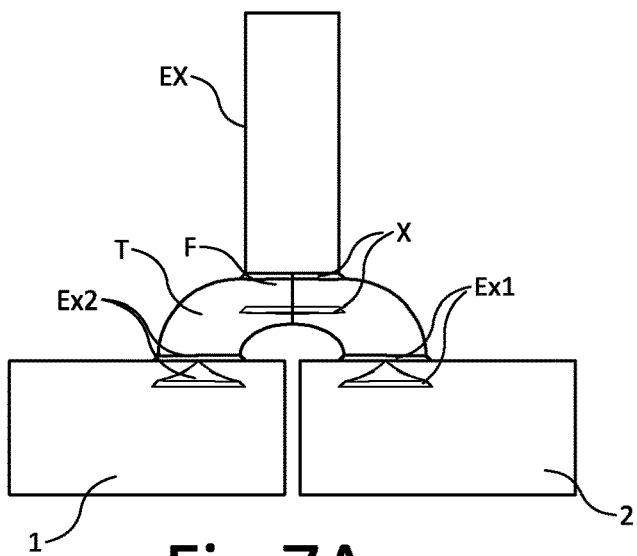
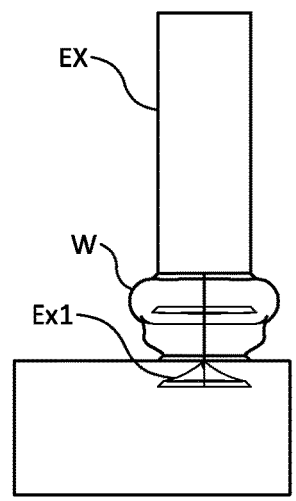
Fig.7A  Fig.7B
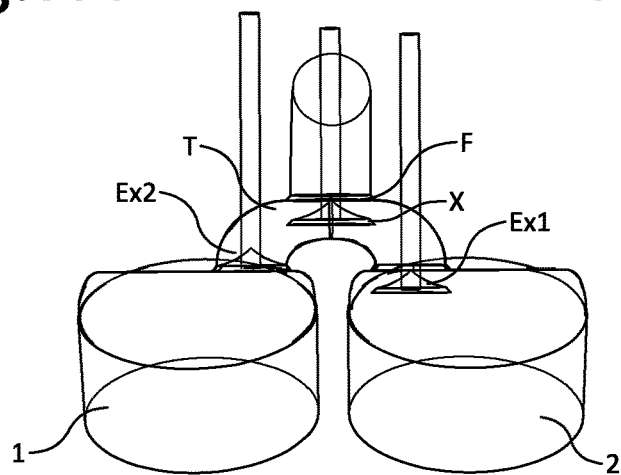
Fig.7C
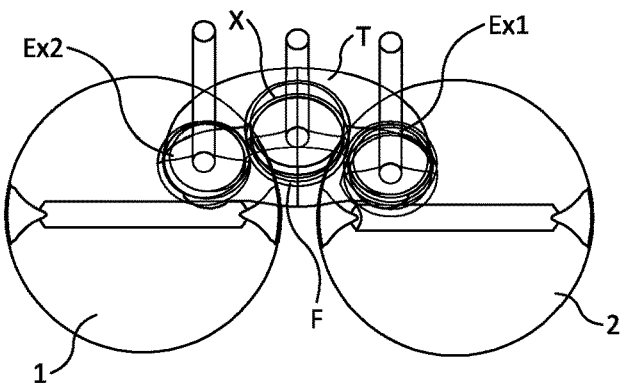
Fig.7D

COMBUSTION ENGINE

CROSS-REFERENCE TO RELATED APPLICATIONS

This application is a continuation of International Application No. PCT/IB2020/059835, filed Oct. 20, 2020, which claims priority to NL Patent Application No. 2024073, filed Oct. 21, 2019, the contents of each of which are incorporated by reference herein.

The present invention relates to a combustion engine, comprising at least a first combustion chamber and a second combustion chamber, said first combustion chamber and said second combustion chamber each having a reciprocating piston, at least one intake port, each with an associated intake valve, and at least one exhaust port, each with an associated exhaust valve, wherein said piston performs an exhaust stroke in each cycle of said engine, wherein said first combustion chamber and said second combustion chamber are connected with one another through a transfer channel that is controlled by a transfer valve to suppress direct combustion gas communication between said combustion chambers during a high load mode of operation of said engine and to open direct combustion gas communication between said combustion chambers during said exhaust stroke in a partial load mode of operation of said engine. The present invention more particularly relates to an internal combustion engine having reciprocating pistons. More specifically, this invention relates to an internal combustion engine having the ability to deactivate combustion chambers for energy efficiency enhancement using the principle of overexpansion.

Currently the internal combustion (IC) engine is by far the predominant type of engine used today for purposes of providing power to propel motorized vehicles, as well as many other forms of transportation and recreation devices. When compared to other forms of automotive power, the internal combustion engine is preferred for high power density, high reliability and convenient energy storage potential that expresses itself as the distance traveled between refueling and refill time. However, concern for preservation of natural resources and for the environment has continuously encouraged efforts to improve the efficiency, performance and fuel economy of IC engines while reducing their harmful emissions and noise.

Various arrangements have been suggested to improve the combustion efficiency of IC engines. One way of improving the efficiency is by deploying combustion chamber deactivation when only a partial load is demanded of the engine. This principle is applied on several production vehicles. A combustion engine of this kind is known from German patent application DE 10 2013 006 703. This document describes a four combustion chamber inline engine in which the centre pair of combustion chambers is deactivated during a partial load mode of operation. These combustion chambers are activated again when the load demand on the engine requires so to gain full power capabilities. To further boost the overall efficiency this known engine moreover gains additional performance from overexpansion of the combustion gasses during partial load to increase efficiency of the engine. To that end the outer combustion chambers, referred to as first combustion chambers, comprise only one exhaust port, while the other exhaust port serves as a transfer port that connect via a transfer channel to a corresponding transfer port on the adjacent one of the centre combustion chambers, referred to as second combustion chambers. These centre combustion chambers communicate to one another through a transfer channel that is provided at the intake side of these combustion chambers by sacrificing one of the intake ports.

During partial load the transfer channels are open to allow overexpansion of the combustion gasses to enter the centre combustion chambers which are now idle. The residual energy stored in the combustion gasses allows these gasses to further expand in the additional volume provided by the centre combustion chambers. This additional expansion is gained as additional efficiency during this mode of operation. On high load, however, the transfer channels are closed by appropriate valves and the centre combustion chambers are activated again to provide full engine power.

An improvement of an internal combustion engine that employs this over-expansion mechanism is described in International patent application WO/2019/083356, the contents of which is incorporated herein by reference. According to this International patent application the transfer channel between adjacent combustion chambers is optimized by minimizing its longitudinal dimension and, moreover, a typical Y-shape exhaust design is disclosed that combines the transfer channel with the exhaust channels of the engine.

Because in over-expansion the burnt gasses are kept in the firing cylinder longer and transferred under a back pressure, there is a risk to not properly flush out the main firing cylinders to accept a new charge of fresh intake air. This might limit performance and efficiency of the engine.

It is inter alia an object of the present invention to further optimize the performance of an internal combustion engine that operates in an over-expansion mode of operation, deactivating one or more combustion chambers, when delivering merely a partial load, allowing the transfer of combustion gasses to the de-activated combustion chambers.

To that end, a combustion engine of the type described in the opening paragraph, according to the invention is characterized in that said transfer valve is a timed valve, particularly a poppet valve, that is timed each cycle of said engine in said partial load mode of operation to suppress said direct combustion gas communication prior to an end of said exhaust stroke, and in that the exhaust valve of at least one of said at least one exhaust port of said first combustion chamber is a timed valve that is timed each cycle of said engine in said partial load mode of operation to open before said end of said exhaust stroke. Hereinafter the combustion chambers will also be referred to as the cylinders of the engine.

This timing of the transfer valve and the exhaust valve causes the transfer en expansion of combustion gasses into the second combustion chamber to be cut off before the end of the stroke and the remainder of the combustion gasses to be released into the exhaust. This particularly allows a small overlap period in valve timing where both the intake valves and exhaust valves are at least partially open. The exhaust at that moment is closing while the intake is starting to open. Fresh air can start moving, helping the charge of air to enter the chamber and the exhaust gasses to exit. This will also contribute to a cooling of the valves.

In a preferred embodiment the engine according to the invention is thereby characterized in that said transfer valve is timed to suppress said direct gas communication between said combustion chambers and said exhaust valve is timed to open the associated exhaust port after approximately 50% of said exhaust stroke, particularly around 60% of said stroke, and more particularly around 75% of said stroke. The invention is thereby based on the recognition that already at mid-transfer, a predominant portion of the total amount of combustion gasses will have transferred to the over-expanding cylinder(s). At 50% stroke, already around 70% is transferred, and at 60% stroke, around 80% is transferred. Hence, cutting off the transfer around this timing of the stroke and instead releasing the remainder of the gasses into the exhaust to flush the main firing cylinder will help the overall performance of the engine while hardly not deteriorating the power benefit of over-expansion during partial load operation.

The in order to create a transfer channel between the adjacent cylinders these cylinders may be designed with dedicated overflow port, having one or more dedicated valves. A preferred embodiment of the engine according to the invention, however, is characterized in that said transfer channel connects one of said at least one exhaust port of said first combustion chamber with one of said at least one exhaust port of said second combustion chamber, and in that said transfer valve comprises a timed auxiliary valve between said transfer channel and an exhaust of said engine. This manner, the transfer channel is guided through the existing exhaust system of the engine without requiring additional ports in the cylinders. As a consequence, the exhaust ports can accommodate three possible gas streams: a transferring operation between cylinders; the exhaust from the first cylinder connected; and the exhaust from the second cylinder connected.

In a further preferred embodiment, the engine according to the invention is characterized in that said transfer channel comprises a flattened wall portion with an valve opening that is surrounded by a valve seat to accommodate said auxiliary valve. By flattening and widening the cross-section of the transfer channel, whilst not significantly changing the hydraulic diameter, a poppet valve can be accommodated in the intermediate section of the transfer channel having this flattened wall portion, without compromising the flow resistance of the channel.

To further minimize flow losses in the transfer channel, a further embodiment of the engine according to the invention is characterized in that a cross section of said transfer channel expands, preferably gradually, from said exhaust port of said first combustion chamber towards said auxiliary valve opening and contracts, preferably gradually, from said auxiliary valve opening towards said exhaust port of said second combustion chamber. This manner, the gasses are allowed to expand upon entry in the transfer channel while the opposite happens when contracting the gasses into the receiving cylinder opening. This dynamic behaviour of the gas streams happens to minimize flow losses by allowing the gasses to expand in all (or most) directions before entering a bend in the transfer channel that transitions into the flattened mid-section of the transfer channel.

By placing the auxiliary valve in this mid-section of the channel, the auxiliary valve can be placed in line with the original valves. This opens the possibility for a further embodiment of the engine according to the invention that is characterized in that said at least one exhaust valve and said auxiliary valve are in line with one another and are controlled by a common cam shaft, having a cam body that controls the associated valve to force a closing and opening thereof during said exhaust stroke. This way the auxiliary valve is operated on the same camshaft as the other cylinder-based exhaust valves and the need for a dedicated camshaft or of other actuation methods can be avoided to greatly simplify engine design.

In order to facilitate a different timing of the valves involved, depending on either a high load mode of operation or a partial, over-expansion mode of operation, a further embodiment of the engine according to the invention is characterized in that said cam shaft is a variable cam shaft carrying sets of axially spaced cam bodies for said auxiliary valve and said exhaust valves respectively, and in that said cam shaft is adjustably suspended to allow a first cam body of said sets of cam bodies, controlling said auxiliary valve and said at least one exhaust valve in said high load mode of operation of said engine, and a second cam body of said sets of cam bodies, controlling said auxiliary valve and said at least one exhaust valve in said partial mode of operation of said engine.

A particular embodiment of the engine according to the invention is characterized in that said auxiliary valve is controlled by a cam body of said cam shaft that comprises at least a first and a second lobe acting consecutively upon said auxiliary valve each cycle of said engine in said partial load mode of operation. By applying such a double lobe cam, optimal release of the final exhaust gasses is enabled.

Although the invention requires two combustion chambers as a minimum to employ both combustion chamber de-activation and rerouting of the exhaust gasses to the idle combustion chamber to allow over-expansion, a particularly practical embodiment of the engine according to the invention, is characterized by comprising at least a third and a fourth combustion chamber that are at least substantially configured mirrored with respect to said first and second combustion chamber. These further combustion chambers act substantially similar to the first set of said first combustion chamber and second combustion chamber by comprising a further transfer channel in between them that is controlled by a timed transfer valve, particularly a poppet valve, in a similar fashion and with a similar timing as between the first and second combustion chamber. Both the second and third combustion chamber will be idle to allow for the transfer and over expansion of the combustion gasses during partial load mode of operation of the engine. These cylinders may be interconnected at that time to allow a free communication between them.

This embodiment concerns at least four combustion chambers, the first and fourth combustion chamber operating in every mode of operation, while the second and third combustion chamber are deactivated during partial load operation and provide additional expansion capability to the exhaust gasses emanating from the first or fourth combustion chamber. A transfer channel between the second and third combustion chambers allows these combustion chambers to act as a single over-expansion volume. A valve to open this channel during partial load and to close this path during high load may be a simple, relatively slow valve as it is allowed to maintain is state during consecutive engine revolutions as long as the specific mode of operation lasts, in particular a plunger or rotating type valve, that is activated or de-activated during these consecutive engine rotations.

The intake ports of the combustion chambers as well as their exhaust ports are controlled by respective valves that need to be sufficiently fast to open and close on the right instance during each cycle of the engine. To that end, a preferred embodiment of the engine according to the invention is characterized in that the intake ports of said first combustion chamber and said second combustion chamber comprise poppet valves, that are activated within one engine rotation and are controlled by a first (variable) cam shaft, and in that the exhaust ports of said first combustion chamber and said second combustion chamber comprise poppet valves, that are activated within one engine rotation and are controlled by a second (variable) cam shaft. Both camshafts may be variable by means of for instance an adapted cam profile in combination with hydraulic, mechanical or electronic camshaft shift technology.

Using the same technology, a specific embodiment of the engine according to the invention is characterized in that said auxiliary valve of said transfer channel comprises a poppet valve that is actuated by a further variable cam shaft. This additional camshaft operates the (poppet) valve(s) in the transfer channel between the primary (first) combustion chamber(s) and the secondary (second) combustion chamber(s) to reroute the exhaust gasses for over expansion during partial load operation. In case of a double overhead cam shaft engine, this overexpansion camshaft may be provided in between the intake camshaft and the exhaust camshaft along the path of shortest distance between the combustion chambers.

Efficiency optimization during overexpansion to other cylinders is a crucial aspect for practical implementation in road vehicles. Due to the dynamic behaviour of road vehicles one-cycle or less response time is required to avoid drivability compromises. Addition of hybrid-electric drive enhances the need for close to seamless transition between propulsion modes:
  Full electric (no combustion engine)
  Hybrid drive—overexpansion mode
  Overexpansion mode
  Full combustion engine operation
  Hybrid drive—with full combustion engine operation Switching between drives with a delay would heavily impact the drivability and 'fun-to-drive' which is a considerable issue in passenger car industry. Any hic-ups, noise or vibration is often perceived as unacceptable. Using the setup of the invention, this is minimized and/or resolved.

Secondly using an optimized routing of the channels, heat loss is minimized, enhancing the efficiency of overexpansion. This extends the operational field in which overexpansion can be applied and, hence, even further improves fuel efficiency. Finally optimizing gas rerouting further reduces engine vibrations compared to cylinder de-activation.

The invention will now be described in greater detail with reference to certain exemplifying embodiments along the lines of an accompanying drawing. In the drawing.

Figure 1:
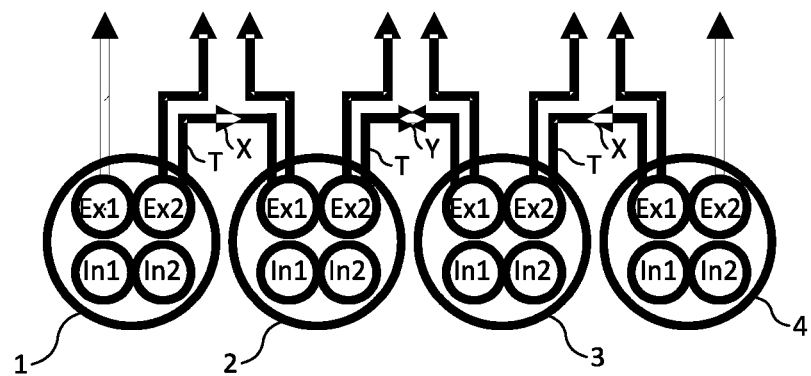
FIG. 1 shows the general internal layout of a 4-inline combustion engine according to the invention enabling over-expansion in partial load mode of operation.

FIG. 7A-D show different views of a transfer channel design with an auxiliary poppet valve to connect adjacent cylinders.

It should be understood that the drawing is purely schematic and not necessary drawn to the same scale. In particular, certain dimension may have been exaggerated to a greater or lesser degree to render the figures more lucid. Same parts are designated by same reference numerals throughout the figures.

FIG. 1 shows a typical 4-cylinder internal combustion engine layout with four inline combustion chambers or cylinders 1 . . . 4. Throughout this description the expression "cylinder" and "combustion chamber" may be used alternately as synonyms of one another. This engine typically has a firing order '1-3-4-2' and typically a 180-degree crank angle difference between cylinders. This gives a layout where the outer cylinders (numbered 1 and 4) are in phase with each other, and the inner cylinders (2 and 3) are also in phase with each other. In a high load mode of operation, also referred to as full-fire mode, all cylinders fire in a 4-stroke (intake, compression, power, exhaust) manner. In a partial load mode of operation, also referred to as over-expansion mode, the outer cylinders 1+4 fire, but the exhaust stroke is replaced by a complex action, transferring the exhaust gasses into cylinders 2+3. These cylinders 2+3 act as a low-pressure over-expansion system, where remaining gas pressure is converted into useful work. Each 360 crank degrees, the cylinder cylinders 1 and 4 alternate this operation, making the cylinders 2+3 combined act in a two-stroke manner, receiving gasses alternately between cylinder 1 and 4. In practice, however, the firing order may vary without departing from the general principle of the present invention.

Each cylinder comprises two intake ports In1,In2 that are controlled by intake poppet valves and two exhaust ports Ex1,Ex2 that are controlled by exhaust poppet valves. The intake poppet valves are actuated by an intake camshaft, whereas the exhaust poppet are operated by an exhaust camshaft that actuates these valves. At the lower end, the engine a crankshaft is driven by piston rods extending from the pistons that alternately reciprocate within the cylinders 1 . . . 4 in consecutive strokes of the engine.

Engine performance depends on the ability to breath in air, the conditions of the air/fuel/exhaust gas mixture and the ability to exhaust the waste gasses. Gas flow is increased by utilizing multiple valves, and making them as large as practically possible. At high power outputs, a large intake opening is preferred, enabling less resistance and an as high as possible charge of air. In order to reduce combustion temperatures, exhaust gas re-circulation (EGR) is can be utilized. Finally, in order to flush the remaining exhaust gasses at the end of the exhaust stroke, a small overlap period is used, where both the intake and exhaust valves are partially open. The exhaust at that moment is closing while the intake is starting to open. Fresh air can start moving, helping the charge of air to enter the chamber and the exhaust gasses to exit. This scavenging also helps cooling the valves. In general, because of inertial and wave effects, valves are not opened right at Top Dead Center (TDC) or Bottom Dead Center (BDC), but before. For example, an exhaust valve can typically open 120-130 crank degrees past TDC to allow time for the gas to exit.

In order to have uncompromised full-fire operation, a standard 4-valves-per-cylinder operation is preferred, where the intake is standard, and the exhaust can exit though both exhaust valves in a manner similar to an engine without the over-expansion switching system present. Extra dedicated valves in the combustion chamber will complicate the design of the engine significantly. The engine of this example therefore uses the exhaust ports Ex1,Ex2 and the associated poppet valves of the cylinders together with dedicated auxiliary valves X,Y in the exhaust system for rerouting the gasses during partial load mode of operation.

FIG. 1 shows a typical routing of the gas streams that is possible with four valves per cylinder and three transfer channels, each having an auxiliary valve X,Y, that interconnect adjacent cylinders. The valves can accommodate three possible gas streams, depending on the mode of operation:
1 the transferring operation between cylinders;
2 the exhaust from the first cylinder connected; and
3 the exhaust from the second cylinder connected.

Figure 2:
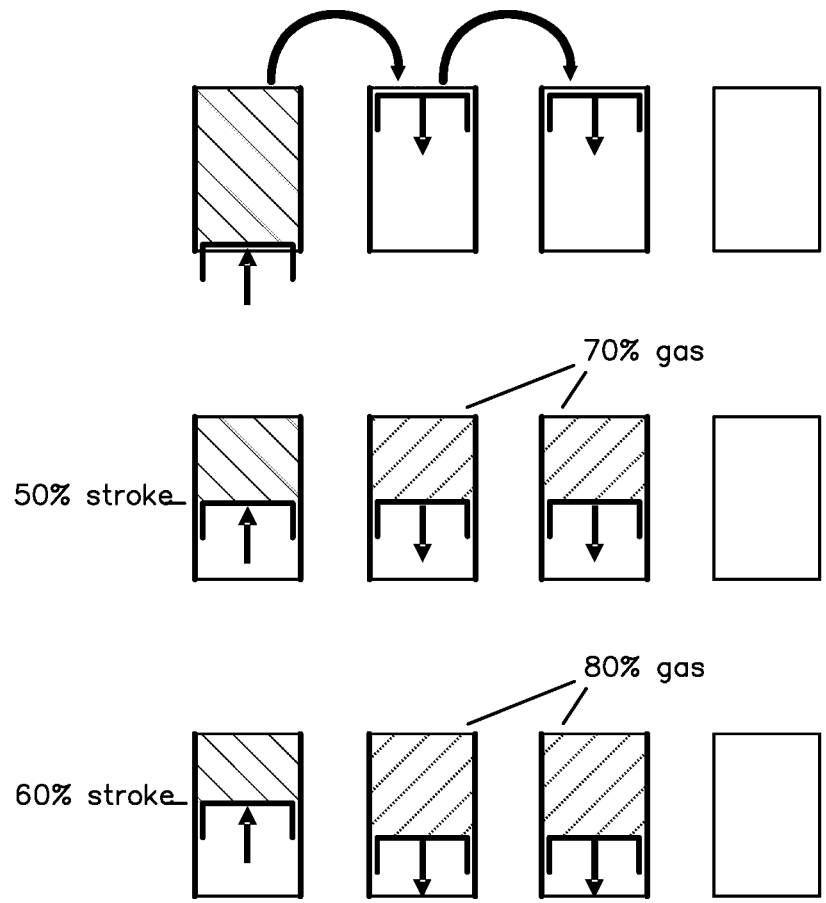
FIG. 2 shows schematically the transfer of combustion gasses from the firing cylinder into the central cylinders that allow over-expansion.
Figure 3:
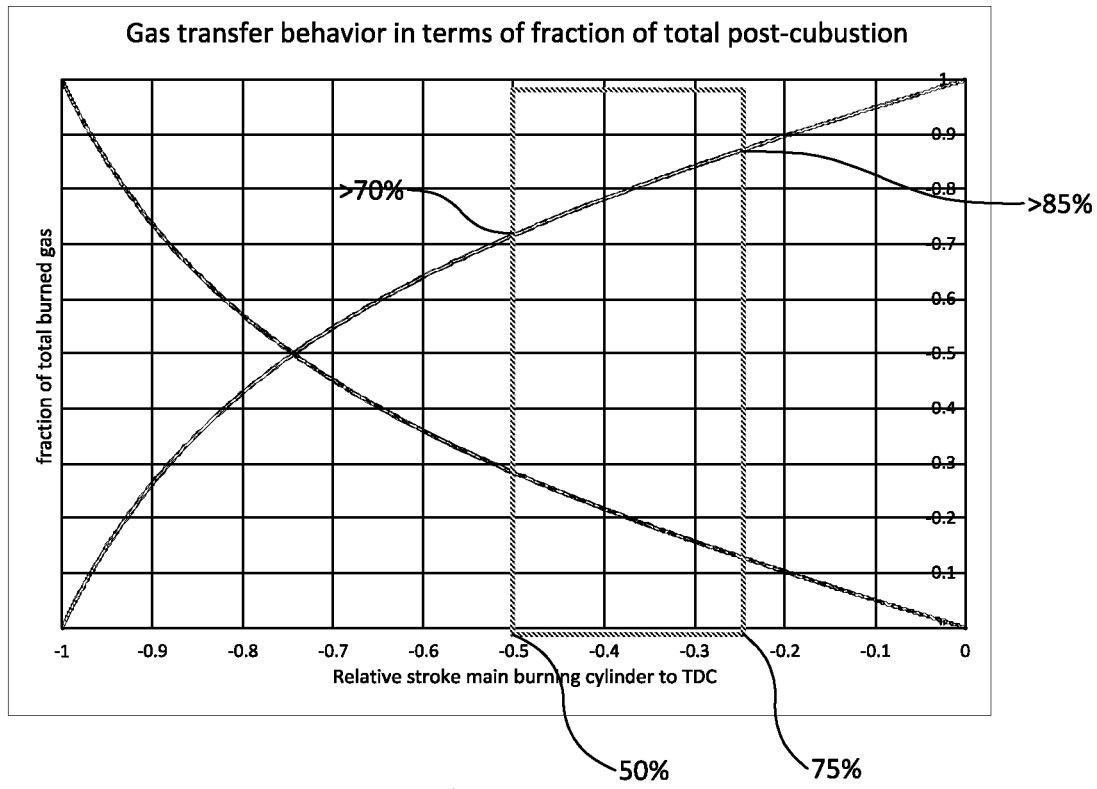
FIG. 3 shows graphically the transfer of combustion gasses from the firing cylinder into the central cylinders that allow over-expansion.

In order to not deteriorate the combustion in the firing cylinders under over-expansion mode, a good scavenging of the exhaust gasses is needed. Because in over-expansion the combustion gasses are kept in the firing cylinder longer and transferred under a back pressure, there is a risk to not properly flush out the main firing cylinders to accept a new charge of fresh intake air. This will limit performance and efficiency. FIG. 2, however, illustrates that already at after a partial stroke of the piston in the firing cylinder, a major portion of the total amount of combustion gasses is present is in the over-expanding cylinders. At 50% stroke, already around 70% is transferred, and at 60% stroke, around 80% is transferred. Therefore, according to the invention, the rerouting of the combustion gasses to the central cylinders 2+3 is cut off around this timing of the stroke and, instead, the remainder of the gasses is released into the exhaust to flush the main firing cylinder.

Figure 4:
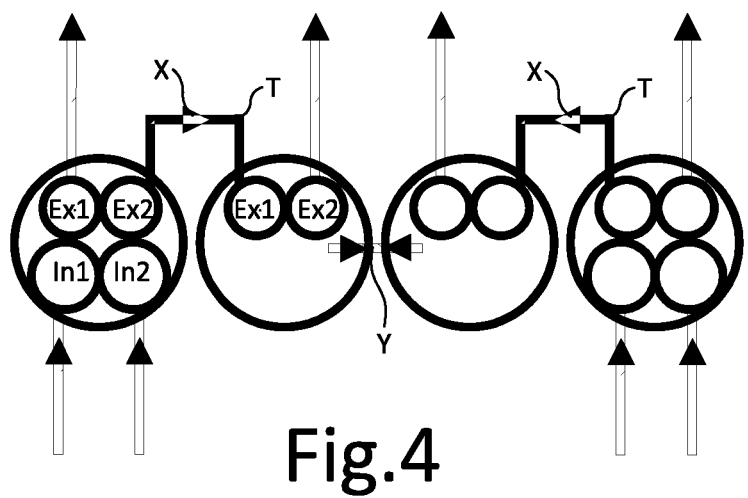
FIG. 4 shows an alternative mode of operation of the engine of FIG. 1.

An example of this setup is shown in FIG. 4, using valve Ext of cylinder one for the transfer (TR) in an 'Y-type' transfer channel T and valve Ex1 for this high-pressure (HP) release from the firing cylinder. This causes a peculiar and novel valve operation where during a single stroke two different valves are opened and closed sequentially with some overlap. In case of auxiliary poppet valves X in the hybrid exhaust/transfer channel T, this sequential flipping during one stroke can also be executed there.

Figure 5:
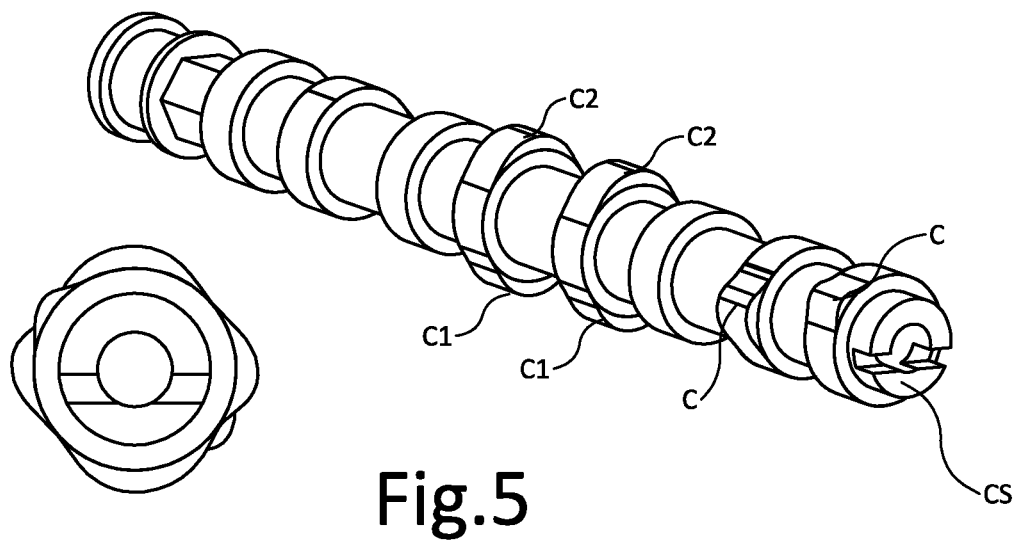
FIG. 5 shows a novel cam shaft design that is used in the engine of FIG. 1.
Figure 6:
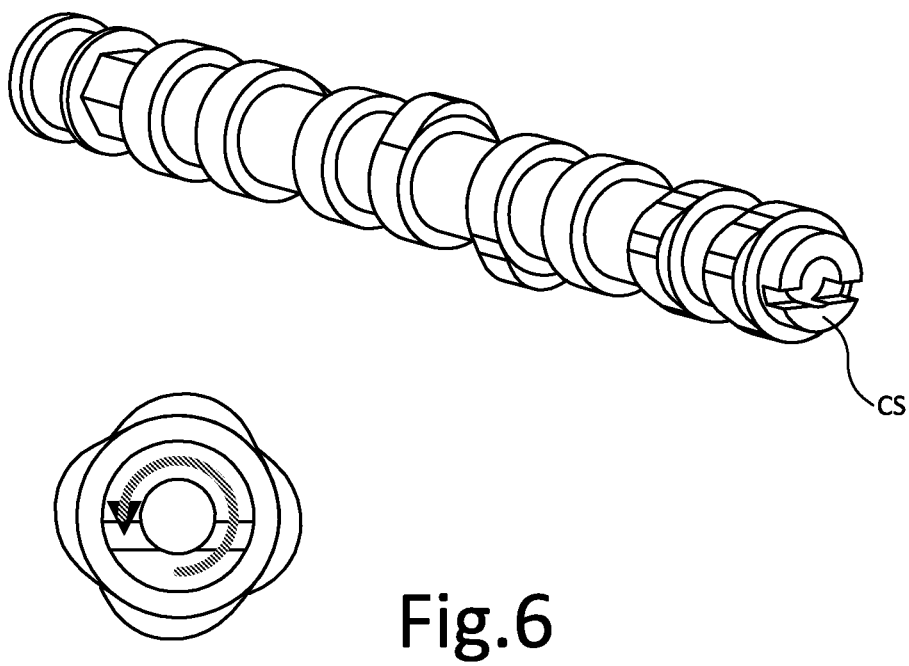
FIG. 6 shows a conventional cam shaft design.

FIG. 5 shows an example camshaft CS that enables this kind of timing. The cam shape has been adjusted to accommodate a rocker-roller arm. The cam profile is, hence, not necessarily the same as the corresponding lift profile. Compared to a normal stock cam, shown in FIG. 6, for the exhaust stroke, the valve operation is split into two distinct lobes C1,C2 operating different valves of the same cylinder. The cam profiles can be adjusted in profile and max lift to accommodate increased material accelerations and jerk. As shown in FIG. 5, use is made of a double-lobe cam for the lower pressure (LP) release from the over-expanding cylinders. The gas flow is depicted in FIG. 4 and the double lobe cam is shown on the left of the cas shaft of FIG. 5. The over-expanding cylinders act in a peculiar two-stroke manner accepting gasses from outer cylinders alternatively. Therefore, the LP exhaust behaves in a two-stoke manner as well. By applying a double lobe cam, optimal release of the final exhaust gasses is enabled.

FIG. 7A-D show a particular design of the overflow transfer channel that is created between the first and second cylinder 1,2. A similar transfer channel is present between the fourth and third cylinder 3,4, while also the centre cylinders 2,3 may be connected this way. In order to minimize flow losses, a minimum radius of curvature bend is needed to minimize flow separations off the inner walls. Also, sharp direction changes should be avoided. The transfer port should also have an as much as possible shortest length to minimize dead volume losses. The proposed novel design is to flatten and widen the cross-section of the transfer channel, whilst not significantly changing the hydraulic diameter. This way a poppet valve X can be accommodated in the flattened mid-section F of the transfer channel. Another novel design aspect to minimize flow losses, is to create a cross section W that expands (widens) downstream of the delivering exhaust port Ex1 in all (or most) directions before entering the channel bend that transitions to the flat intermedia portion F. The opposite is the case at the opposite side, contracting the cross section into the receiving cylinder opening Ex1.

By placing a (slightly larger) poppet valve X in the mid-section F of the channel, the auxiliary poppet valve X can be placed in line with the original valves Ex1,Ex2, see FIG. 7D. This way the auxiliary valve X can be operated on the same camshaft as the other cylinder-based valves Ex1, Ex2 and the need for a dedicated camshaft or other actuation methods is avoided. Any misalignments of this system can be compensated using rocker arms, providing some freedom in this design.

The present invention provides a novel HP release in order to enable flushing for an intake charge. This releases the remaining exhaust gasses to the exhaust and enables flushing of the firing cylinder(s) by creating an overlap with the intake flow (scavenging). A method to enable this, if there is not a dedicated release, is to retard the transfer timing and/or advance the LP release timing, creating an open loop between the main firing cylinder intake and the over-expansion cylinder LP exhausts. Retarding the TR and advancing the LP timing also has effects on the over-expansion pressure-volume loop. Advancing the LP provides a pre-compression in the over-expanding cylinders (in red) and retarding the TR minimizes dead volume losses so more pressure is retained (in green).

Although the invention has been described with reference to merely a few exemplifying embodiments it will be understood that the invention is by no means limited to these examples. On the contrary many modifications and variations are feasible to a skilled person without requiring him to depart from the scope and spirit of the present invention. As such both embodiments focused on a 4-cylinder engine, however the same or similar principle would also work on other internal combustion engine configurations, such as two, six and eight cylinders, whether placed inline, in a V-configuration or opposite one another.

What is claimed is:
1. A combustion engine, comprising:
at least a first combustion chamber and a second combustion chamber, said first combustion chamber and said second combustion chamber each having a reciprocating piston,
at least one intake port, each with an associated intake valve, and
at least one exhaust port, each with an associated exhaust valve,
wherein said piston performs an exhaust stroke in each cycle of said engine,
wherein said first combustion chamber and said second combustion chamber are connected with one another through a transfer channel that is controlled by a transfer valve to suppress direct combustion gas communication between said combustion chambers during a high load mode of operation of said engine and to open direct combustion gas communication between said combustion chambers during said exhaust stroke in a partial load mode of operation of said engine,
characterized in that said transfer valve is a timed valve, particularly a poppet valve, that is timed each cycle of said engine in said partial load mode of operation to suppress said direct combustion gas communication prior to an end of said exhaust stroke, and
in that the exhaust valve of at least one of said at least one exhaust port of said first combustion chamber is a timed valve that is timed each cycle of said engine in said partial load mode of operation to open before said end of said exhaust stroke.

2. The combustion engine of claim 1, wherein said transfer valve is timed to suppress said direct gas communication between said combustion chambers and said exhaust valve is timed to open the associated exhaust port after approximately 50% of said exhaust stroke, particularly around 60% of said stroke, and more particularly around 75% of said stroke.

3. The combustion engine of claim 1, wherein said transfer channel connects one of said at least one exhaust port of said first combustion chamber with one of said at least one exhaust port of said second combustion chamber, and in that said transfer valve comprises a timed auxiliary valve between said transfer channel and an exhaust of said engine.

4. The combustion engine of claim 3, wherein said transfer channel comprises a flattened wall portion with an valve opening that is surrounded by a valve seat to accommodate said auxiliary valve.

5. The combustion engine of claim 4, wherein a cross section of said transfer channel expands, preferably gradually, from said exhaust port of said first combustion chamber towards said auxiliary valve opening and contracts, preferably gradually, from said auxiliary valve opening towards said exhaust port of said second combustion chamber.

6. The combustion engine of claim 3, wherein said at least one exhaust valve and said auxiliary valve are in line with one another and are controlled by a common cam shaft, having a cam body that controls the associated valve to force a closing and opening thereof during said exhaust stroke.

7. The combustion engine of claim 6, wherein said cam shaft is a variable cam shaft carrying sets of axially spaced cam bodies for said auxiliary valve and said exhaust valves respectively, and in that said cam shaft is adjustably suspended to allow a first cam body of said sets of cam bodies, controlling said auxiliary valve and said at least one exhaust valve in said high load mode of operation of said engine, and a second cam body of said sets of cam bodies, controlling said auxiliary valve and said at least one exhaust valve in said partial mode of operation of said engine.

8. The combustion engine of claim 3, wherein said auxiliary valve is controlled by a cam body of said cam shaft that comprises at least a first and a second lobe acting consecutively upon said auxiliary valve each cycle of said engine in said partial load mode of operation.

9. The combustion chambers of claim 1, comprising a third and fourth combustion chamber that are at least substantially configured mirrored with respect to said first and second combustion chamber.

* * * * *